United States Patent [19]
Kinney

[11] 3,923,090
[45] Dec. 2, 1975

[54] DEVICE FOR SPOKING AND ALIGNING WIRE WHEELS

[76] Inventor: Gary W. Kinney, 2615 Scenic View Drive, Huntsville, Ala. 35810

[22] Filed: Oct. 10, 1974

[21] Appl. No.: 513,843

Related U.S. Application Data

[63] Continuation-in-part of Ser. No. 278,629, Aug. 7, 1972.

[52] U.S. Cl. .............................. 157/1.5; 144/288 A
[51] Int. Cl.² ........................................... B21K 1/34
[58] Field of Search ........ 157/1.5, 1.55, 4; 269/109, 269/242; 29/159.02; 144/288 A

[56] References Cited
UNITED STATES PATENTS

| | | | |
|---|---|---|---|
| 186,676 | 1/1877 | Hohenstein | 144/288 A |
| 500,364 | 6/1893 | Baker | 269/242 |
| 1,609,282 | 12/1926 | Ash | 29/159.02 |
| 1,937,833 | 12/1933 | Mondloch | 144/288 A |
| 3,294,145 | 12/1966 | Basset | 157/1.5 |

Primary Examiner—Al Lawrence Smith
Assistant Examiner—Harold P. Smith, Jr.

[57] ABSTRACT

A method and device for spoking and aligning wire wheels in which tapered lug supports hold and reference the position of the hub, and three or more rim engaging members indexed to the hub mount concentrically position the rim of the wheel in precise alignment with the hub, enabling spokes to be inserted or adjusted.

2 Claims, 6 Drawing Figures

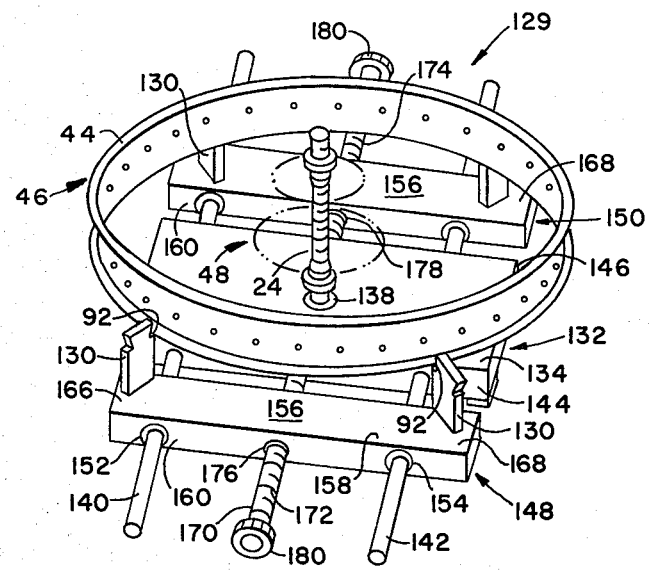
FIG. 6
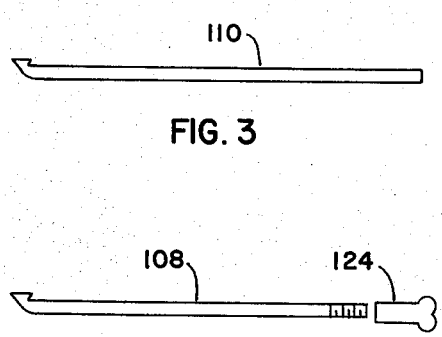
FIG. 3
FIG. 4
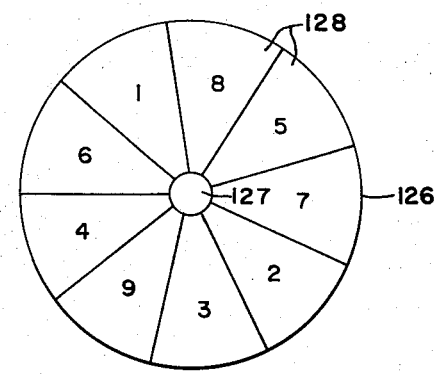
FIG. 5

DEVICE FOR SPOKING AND ALIGNING WIRE WHEELS

This is a continuation-in-part of patent application bearing Ser. No. 278,629, filed on Aug. 7, 1972, now U.S. Pat. No. 3,841,379.

BACKGROUND OF THE INVENTION

1. Field of the Invention

This invention relates to devices employed in spoking or aligning the spokes of a wire wheel and a method of spoking a wheel.

2. Background of the Invention

While devices for holding hubs and wheels for the purpose of spoking or aligning wheels have been previously described in the literature, the applicant is unaware of any such device having been perfected for use in motorcycle and bicycle service shops. For this reason, most such shops find the chore of respoking a wheel so time-consuming and thus expensive that the service is not offered. This, of course, results in one having the wheel which needs to be respoked to have to throw it away and purchase a new one, a substantially economic waste. Alternately, it results in the actual use of wheels which should be repaired but are not due to high costs of such repairs, which results in unsafe wheels being used.

SUMMARY OF THE INVENTION

It is, accordingly, an object of the present invention to provide a new and improved device or fixture for precisely positioning a rim and hub to be respoked or realigned rapidly and enabling relatively unskilled personnel to respoke a wheel in a short time, usually in only about 20 percent of the time which is required without the use of such a device.

In accordance with the invention, a central supporting assembly consisting of conical members are employed to adjustably engage and firmly grip the hub of the wheel to be serviced. A rim holding assembly is connected to the hub support, and three or more rim engaging members are adjustably positionable in a plane perpendicular to the axis of the hub and concentrically indexible, enabling the rim to be rapidly positioned concentric with the hub. The conical members of the hub support may be moved axially, enabling axial alignment with the rim.

BRIEF DESCRIPTION OF THE DRAWINGS

FIG. 3 is a side view of what is termed a blank spoke, a spoke prior to having been cut to length and threaded.

FIG. 4 is a side view of a finished spoke assembly, cut to length, threaded and shown with tightening nipple.

FIG. 5 is a chart illustrating a desired sequence of tightening spokes.

FIG. 6 is a pictoral view of an alternate embodiment of the invention.

DESCRIPTION OF THE PREFERRED EMBODIMENT

Figure 1:
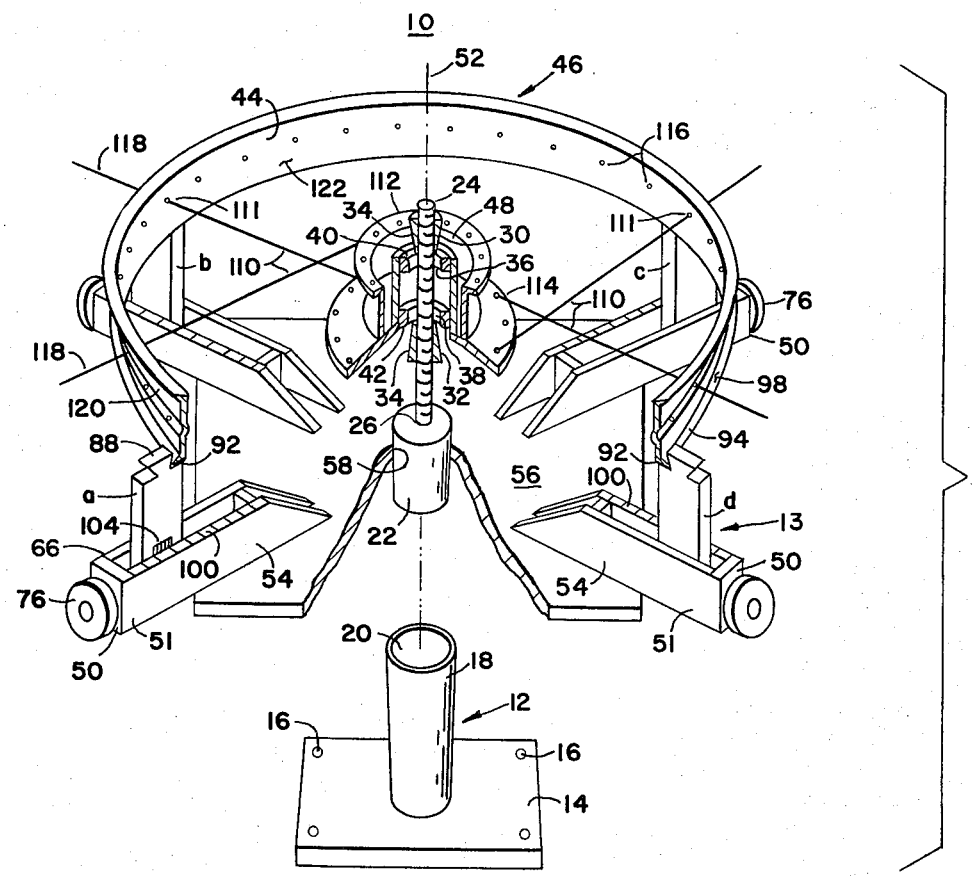
FIG. 1 is an exploded perspective view of a spoking fixture as contemplated by the invention.

Referring to the drawings, spoking tool 10 (FIG. 1) comprises an upright stand 12, adapted to rotatably support holding fixture assembly 13. Upright stand 12 includes horizontal base plate 14 provided with mounting holes 16, through which plate 14 may be secured by lag screws or other suitable fasteners (not shown) to shop floor or other work area. Vertically disposed tubular column 18 is centrally secured to essentially symmetrical base plate 14 and has upper longitudinal opening 20 adapted to rotatably accept central tubular table support member 22 of holding fixture 13.

Figure 2:
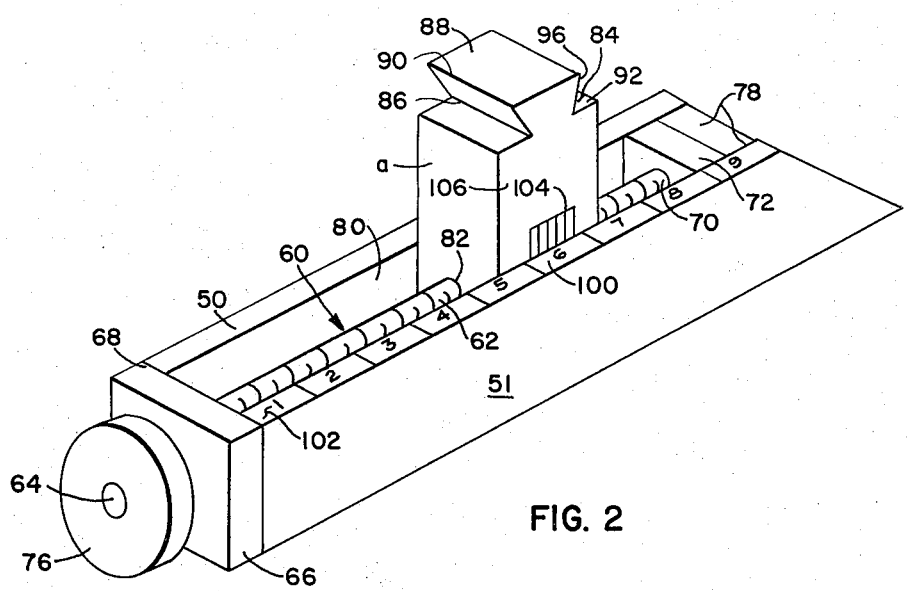
FIG. 2 is an enlarged perspective view of one of the rim engaging assemblies shown in FIG. 1.

Holding fixture 13 includes central threaded stub axle 24, threadably secured at lower end 26 to table support member 22, and locked in permanent lateral alignment by a locking nut (not shown) integral with axle 24. Axle 24 is provided with coneshaped nuts 30 and 32 having inwardly disposed conical surfaces 34 adapted to engage inner raceways 36 and 38 of wheel bearings 40 and 42, respectively. Rim 44 of wheel 46 is supported by and concentrically adjusted about hub 48 by rim engaging jaws a, b, c, and d, slidably supported by mutually perpendicular radial guide arms 50 extending outward from and in a plane perpendicular to axis 52 of central axis 24. Similarly constructed guide arms 50, preferably formed of C-shaped channel 51, have inward portion 54 securely mounted upon central guide support table 56, attached to and about upper end 58 of table support member 22. Since guide arms 50 are identical, only one is illustrated in detail (FIG. 2).

Each of radial guide arms 50 is adapted to support jaw adjusting assembly 60. Jaw adjusting assembly 60 comprises elongated lead screw 62, being journalled for rotation at outer end 64 by bearing block 66 secured to free end 68 of guide arm 50 and at inner end 70 by insert bearing block 72. Vertically disposed rim engaging jaws a, b, c, and d (FIG. 1), preferably formed of rectangular bars, are supported by radial guide arms 50, being dimensioned to slidably engage inner surfaces 78 of longitudinal slot 80 formed in C-shaped channel 51, and provided with through opening 82, adapted to threadably accept lead screw 62. Opposed transverse notches 84 and 86 milled in upper end region 88 of each of jaws a, b, c, and d are adapted to accurately support a rim 44 for respoking or retruing. Each inwardly facing notch 84 includes planar lower surface 92 adapted to engage outer peripheral edge 94 (FIG. 1) of rim 44 and has inclined upper surface 96 adapted to grip inner peripheral surface 98 of rim 44, thus supporting rim 44 in a plane essentially perpendicular to axis 52 of central axle 24. Outwardly disposed transverse notch 86 is similarly configured and provides lip engaging edge 90 adapted to engage the inner peripheral lip of certain rims (not shown).

Axial displacement of jaws a, b, c, and d is indicated by linear scale 100 attached along upper surface 102 of guide arms 50, in mating alignment with longitudinal opening 80. Precise axial position is indicated by vernier scale 104 formed on side 106 of jaws a, b, c, and d, in mating relationship with scale 100 (FIG. 2).

Spoking and wheel alignment tool 10 as herein described may be used to completely respoke a wire wheel or to realign a wheel which, through usage or abuse, has become concentrically or laterally distorted.

In addition, it may be utilized to assemble a desired or special wheel other than that specified for a particular vehicle.

In general, the same assembly procedure is followed when spoking tool 10 is employed to perform any of the above operations except that, when respoking is to be accomplished, the exact length of the new spokes 108 (FIG. 4) must be determined. To determine the required length of spokes 108 (FIG. 4), the rim 44 and hub 48 of wheel 46 must first be supported in fixture 13 as they will be finally assembled (FIG. 1). To accomplish this, first position all of jaws a, b, c, and d approximately equal distances from central axle 24, as indicated by linear scale 100, by rotating adjust knobs 76 until rim 44 of wheel 46 is supported upon planar surface 92 of each of the four jaws a, b, c, and d. Continue to adjust either pair of opposing jaws, a and c for example, until they grip rim 44 lightly and are set at equal readings on scale 100. Set the remaining jaws, b and d in this case, to this same reading. Alternately tighten adjust knobs 76 until jaws a, b, c, and d are firmly engaged with rim 44 and are set at equal readings on scale 100, being careful not to over-tighten so as to distort rim 44. Rim 44 is now essentially concentric with and perpendicular to central axle 24. Loosen only one pair of adjacent jaws, either a and b or c and d, until rim 44 can be removed from fixture 13. Assemble two spoke blanks 110 (FIG. 3) of equal length to upper flange 112 of hub 48 and two similar blanks 110 to lower flange 114 of hub 48, as shown in FIG. 1, and extend them through their respective holes 116 of rim 44. In doing this, it is assumed that one is familiar with the pattern by which spokes 108 or 110 will be assembled; if not, such should first be determined from a similar wheel or other available sources of information, such as a vehicle manual. Next, remove upper cone nut 30 from central axle 24 and position lower cone nut 32 so as to support lower bearing 42 of hub 48. Carefully reinstall and tighten rim 44 to fixture 13, making certain all jaws a, b, c, and d have the same reading on scale 100. This is accomplished while at the same time assembling hub 48 to central axle 24, being careful not to disengage any of spokes 110. Replace upper cone nut 30 and thread onto axle 24 to lightly engage upper bearing 40. Adjust cone nuts 30 and 32 up or down to correctly position hub 48 with respect to rim 44, as determined by a straight edge (not shown) or other suitable instruments, and snugly tighten cone nuts 30 and 32 in order to center hub 48 about axle 24. It is assumed that the relationship between hub 48 and rim 44 is known. If not, a quick check of a typical model wheel assembly will establish the desired relationship. Incrementally rotate hub 48 clockwise or counterclockwise, as required, until protruding segments 118 of upper spoke blanks 110 are of equal length, as measured with respect to periphery 120 of rim 44. This operation also assures that lower spoke blanks 110 will be automatically calibrated. Make a mark 111 on each upper and lower spoke blank 110 approximately ⅛ inch inside inner wall 122 of rim 44. This mark determines the correct length to cut both upper and lower spoke blanks 110.

To remove marked spoke blanks 110 from wheel 46 for use as patterns in cutting a complete set of spokes 108 (FIG. 4), proceed as follows.

Remove upper cone nut 30 from axle 24 and retract adjacent jaws c and d from rim 44. Simultaneously remove hub 48 and rim 44 from holding fixture 13. Disassemble spoke blanks 110, then cut and thread the required number of each of upper and lower spokes 108. Assemble threaded spokes 108 into proper flanges 112 and 114 of hub 48. Reinstall rim 44 into holding fixture 13 by engaging it between jaws a and b. Retighten jaws c and d to their original position equidistant from central axle 24. Carefully assemble hub 48 to central axle 24 and thread on upper cone nut 30, snugly engaging it with upper bearing 40 so as to center hub 48 about axle 24. Align each spoke 108 with its respective hole 116 of rim 44 and lightly thread on a nipple 24 (FIG. 4) with fingers. An alternate method for reinstalling spokes 108 and nipples 124 (FIG. 4) is to install them in rim 44 and hub 48 before installing wheel 46 in spoking tool 10.

A preferred sequence of tightening spokes 108 is illustrated by circular chart 126 (FIG. 5). For convenience, the chart is centrally secured to holding fixture 13 through control opening 127 (FIG. 5) by upper cone nut 30 (FIG. 1). Chart 126 is divided into equal sectors 128. Each sector 128 is positioned to encompass a group of four spokes 108 and contains a number which is indicative of the sequence in which the included spokes 108 are to be tightened. An example of a tightening sequence (for a 36-spoke wheel) is indicated by circular chart 126. This sequence is performed five times. The first tightening cycle includes tightening nipples 124 included within each sector 126 finger tight. During the second and third cycles, nipples 124 are tightened ¼ turn, and for the fourth and fifth cycles, tightened ½ turn. Where a 40-spoke wheel is to be spoked, there would be an equal number of sectors, each having a group of four spokes, with tightening to follow the same pattern, the important aspect being that the spokes be tightened in pairs of oppositely positioned groups of spokes.

At the completion of the fifth round or cycle, retract all jaws a, b, c, and d from rim 44 so wheel 46 will spin freely. While observing rim 44, spin wheel 46 and make additional small adjustments, if necessary, to completely true wheel 46. Spokes 108 may now be equally torqued to any desired tension, and wheel 46 is ready for use.

As previously mentioned, spoking tool 10 can be utilized to realign a warped wheel.

The preferred method of accomplishing this is to first loosen all spokes 108, then install wheel 46 in holding fixture 13 in like manner as heretofore described and perform the tightening sequence as described above.

A second embodiment 129 of the invention, shown in FIG. 6, differs generally from the first embodiment 10 in that rim engaging jaws 130 of second holding fixture 132 are simultaneously adjusted to suitably support a rim 44 (FIG. 1) for respoking. Holding fixture 132 comprises central guide support table 134 and central hub supporting axle 24, configured and assembled in like manner as shown in FIG. 1, to support hub 48 of wheel 46. Guide support table 134 is detachably mounted by central tubular vertical member 138 adapted to rotatably engage upper opening 20 of upright column 18 (FIG. 1). A pair of spaced parallel guide rods 140 and 142 are centrally secured to support table 134 and extend laterally beyond ends 144 and 146, providing slidable support for a pair of diametrically opposed carriages 148 and 150.

Each of carriages 148 and 150 is provided with a pair of spaced linear bearings 152 and 154 adapted to accept guide rods 140 and 142, respectively, being interconnected by transverse frame member 156, in the form of an inverted channel, providing horizontal upper mounting plate 158 integral with vertically disposed side elements 160. Each of carriages 148 and 150 includes a pair of vertically disposed rim supporting jaws 130, configured similar to jaws a, b, c, and d of holding fixture 13 (FIG. 1), being similarly oriented to support rim 44 for respoking. Rim supporting jaws 130 are secured upon horizontal mounting plate 158 near outer ends 166 and 168. Carriages 148 and 150 are adjustably positioned by elongated lead screw 170, being centrally journalled and axially stabilized within a lateral hole (not shown) formed in tubular table support 138. Lead screw 170 is provided with laterally extending threaded portions 172 and 174 having threads of equal pitch but with opposite lead angle. Threaded portions 172 and 174 are engaged with mating threaded inserts 176 and 178, respectively, centrally secured through side elements 160 of frame members 156. Lead screw 170 is adjustably rotated by either of knurled adjust knobs 180 keyed to outer extremities of lead screw 170. In order to respoke or realign a wire wheel while using second holding fixture 132, as described above, a hub and rim are inserted as shown in FIG. 6. Lead screw 170 is adjusted until rim 44 is firmly gripped. Thereafter, the same order of performing the various steps in procedure described above are followed. For example, to determine the correct length of new spokes 108 (FIG. 4), first turn one of adjust knobs 180 in the preferred direction to support rim 44 of wheel 46 upon planar surface 92 of each of jaws 130. Remove rim 44 from fixture 132. Assemble two spoke blanks 110 in like manner as previously described to upper and lower hub flanges 112 and 114 (FIG. 1), rerespectively, and replace rim 44 and hub 48 into holding fixture 132 (FIG. 6). Rotate either of knobs 180 in the preferred direction to clamp rim 44 securely in a concentric relationship to central axle 24. Follow the same procedure to adjust hub 48 and measure spoke blanks 110 as described with respect to holding fixture 13. In order to remove rim 44 from fixture 132, simply turn adjust knob 180 in the appropriate direction to disengage rim 44 from rim support jaws 130. Holding fixture 132 performs the same functions as first holding fixture 13, the only difference being that to secure or release rim 44, it is only necessary to turn either of adjust knobs 180 clockwise or counterclockwise, as required.

What is claimed is:

1. A device for spoking and aligning wire wheels comprising:
   hub mounting means for gripping and providing an axial reference for the center of a hub of a wheel;
   rim supporting means connected to said hub mounting means including means for adjustably and rigidly positioning a rim of a wheel concentrically with respect to said hub comprising:
   four rim engaging members, and
   travel guide means connected to said hub mounting means, being adjustable independent of a said wheel, for orienting and adjustably positioning said rim engaging members along parallel spaced lines in a plane, said plane being perpendicular to and intersecting the axial reference of said hub comprising:
   first and second carriage means, each rigidly connecting a pair of parallel arranged said rim engaging members, and
   means for supporting each of said first and second carriage means and including means for positioning and orienting each of said pair of rim engaging members for travel along like lines and including means for moving each said pair of rim engaging members an equal distance from the axial reference of said hub mounting means.

2. A device as set forth in claim 1 wherein said carriage means for mounting each said pair of rim engaging members includes means for moving each said pair equal distances from said axial reference of said hub mounting means comprising a screw member having a right-handed thread member engaging said first mounting means and a left-handed thread member engaging said second mounting means and further including handle means for rotating said screw member.

* * * * *